March 19, 1968     J. A. GROVES     3,374,268
HITCH CONSTRUCTION

Original Filed Oct. 22, 1965     2 Sheets-Sheet 1

James A. Groves
INVENTOR.

BY *Clarence A. O'Brien*
and *Harvey B. Jacobson*
Attorneys

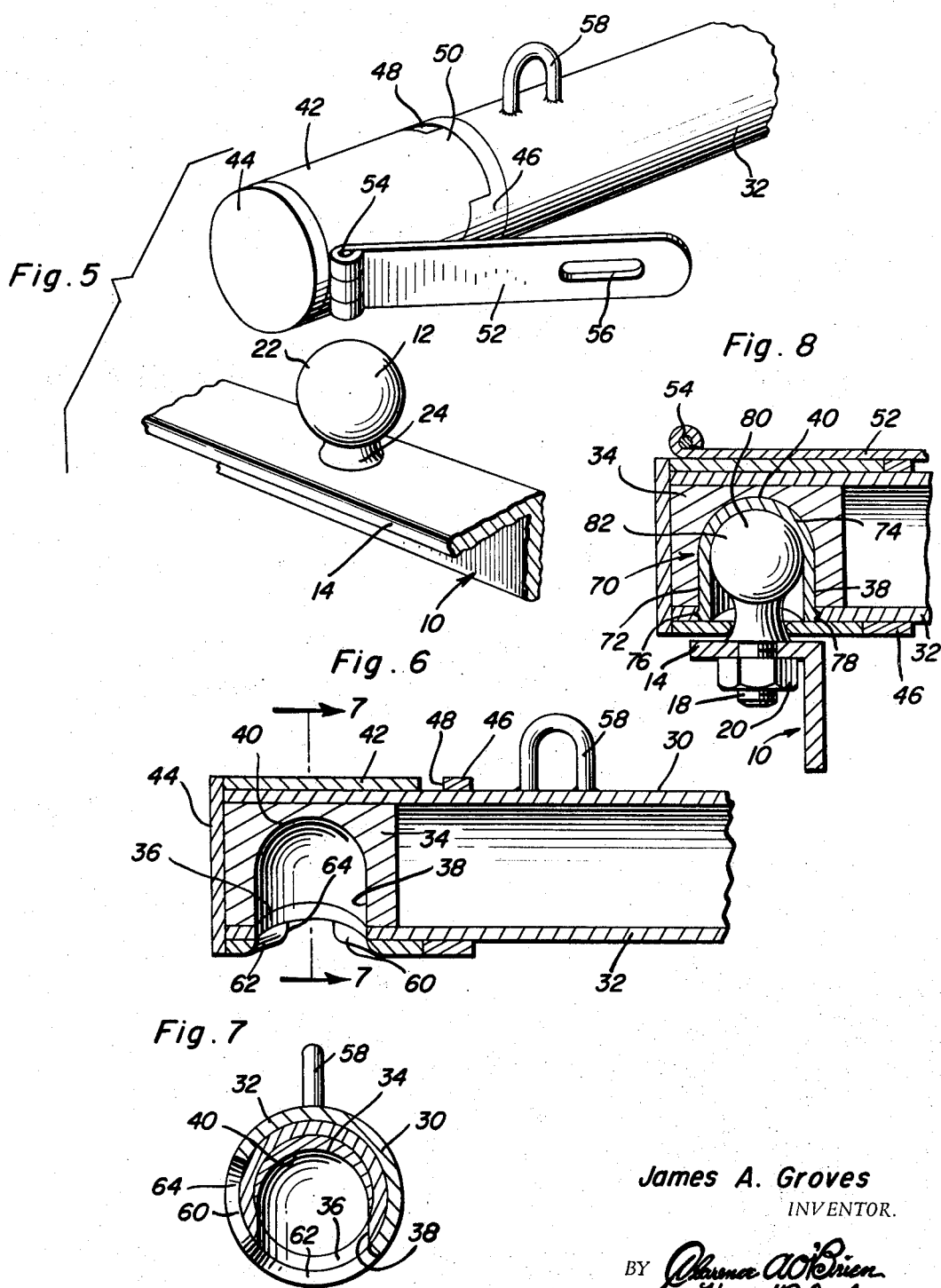

United States Patent Office 3,374,268
Patented Mar. 19, 1968

3,374,268
HITCH CONSTRUCTION
James A. Groves, 1850 W. 9th St.,
Long Beach, Calif. 90813
Continuation of application Ser. No. 501,732, Oct. 22, 1965. This application July 5, 1967, Ser. No. 651,322
7 Claims. (Cl. 280—512)

ABSTRACT OF THE DISCLOSURE

A socket hitch element with a forward end of a trailer tongue including a cylindrical portion at the forward end of the tongue having a downwardly facing radial opening formed therein and with a cylindrical plug member snugly telescoped into the cylindrical portion, which plug member includes a radially outwardly opening recess whose outer end is registered with the opening and which is adapted to seatingly receive the ball portion of a ball hitch element inserted thereinto through said opening, and a sleeve telescoped over the cylindrical end portion and including a circumferential slot whose opposite ends are registrable with the opening and are of wide and narrow dimensions adapted to pass therethrough the aforementioned ball portion and to snugly receive the reduced diameter shank portion of the ball hitch element, respectively.

---

This application is a continuation of application Ser. No. 501,732 filed Oct. 22, 1965.

This invention relates to a novel and useful socket hitch construction and more specifically to a socket hitch assembly adapted to be supported from the forward portion of the tongue of a trailer and to removably receive therein a conventional bar hitch member of the type including a diametrically reduced shank portion.

Conventional socket hitch assemblies include body portions defining downwardly opening sockets and provided with bifurcated clamping members for embracingly engaging the underside of the ball portion of a ball hitch member on opposite sides of the diametrically reduced shank portion of the ball hitch member and securing the ball hitch member within the socket. Such bifurcated members are either screw or lever actuated and must be tightened after a short period of use in order to insure that the associated ball hitch member is fully and snugly seated within the corresponding socket. Further, manufacturing costs involved with the production of conventional hitch assemblies including the aforementioned bifurcated members are necessarily higher than minimal.

Accordingly, it is the main object of this invention to provide a socket hitch assembly adapted to be utilized in connection with a conventional ball hitch member and operable to fully seatingly receive an associated ball hitch member upon its initial engagement with the socket hitch element of the instant invention and including structural elements which may be readily manufactured at minimum cost to the manufacturer.

Another object of this invention is to provide a second hitch element including novel means for releasably securing an associated bar hitch element therein.

Still another object of this invention, in accordance with the immediately preceding object, is to provide locking means for securing a ball hitch member in the socket hitch assembly of the instant invention which will be simple in construction and easy to operate.

Yet another object of this invention is to provide a socket hitch assembly that may be readily adapted to operatively receive ball hitch elements having ball portions of varying diameters.

A final object of this invention to be specifically enumerated herein is to provide a socket hitch assembly in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a fragmentary exploded perspective view of the assembly illustrated in FIGURE 1 and with the locking portion of the socket hitch assembly of the instant invention shown in the unlocked position;

FIGURE 6 is a fragmentary longitudinal vertical section view taken substantially upon a plane passing through the longitudinal center line of the socket hitch assembly illustrated in FIGURE 5;

FIGURE 7 is a transverse vertical sectional view taken substantially upon the plane indicated by section line 7—7 of FIGURE 6; and FIGURE 8 is a fragmentary vertical sectional view similar to FIGURE 2 but illustrating the manner in which the socket hitch element may be adapted to receive a smaller ball hitch element.

Figure 1:
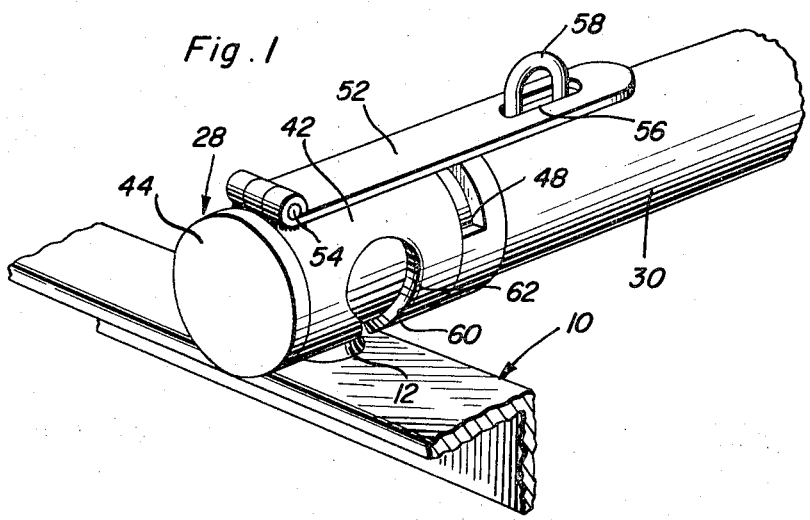
FIGURE 1 is a fragmentary perspective view of the tongue portion of a trailer shown with the socket hitch assembly of the instant invention operatively mounted on and operatively engaged with a ballhitch member carried by a supporting portion of a towing vehicle.

Referring now more specifically to the drawing the numeral 10 generally designates a mounting portion of a towing vehicle to which a conventional ball hitch element 12 is secured. The mounting portion 10 comprises an angle iron including a horizontal flange 14 apertured as at 16 to receive therethrough the threaded shank portion 18 of the ball hitch element 12. The threaded shank portion 18 is secured through the aperture 16 by means of a conventional threaded fastener 20 and it may be seen from FIGURE 2 of the drawings that the ball hitch element 12 includes an upper generally spherical ball portion 22 and a lower diametrically reduced neck or shank portion 24 including a shoulder 26 abutted against the upper surface of the flange 14 and supporting the ball portion 22 from the threaded shank portion 18.

The socket hitch element of the instant invention is generally referred to by reference numeral 28 and comprises the forward portion of a conventional trailer tongue 30. The tongue 30 is defined by a cylindrical member 32 and has a plug 34 secured in its forward end. The cylindrical member 32 has an opening 36 formed therein which is registered with a generally radial bore 38 formed in the plug 34 and including a generally semi-spherical inner end wall 40 defining a seat.

Figure 2:
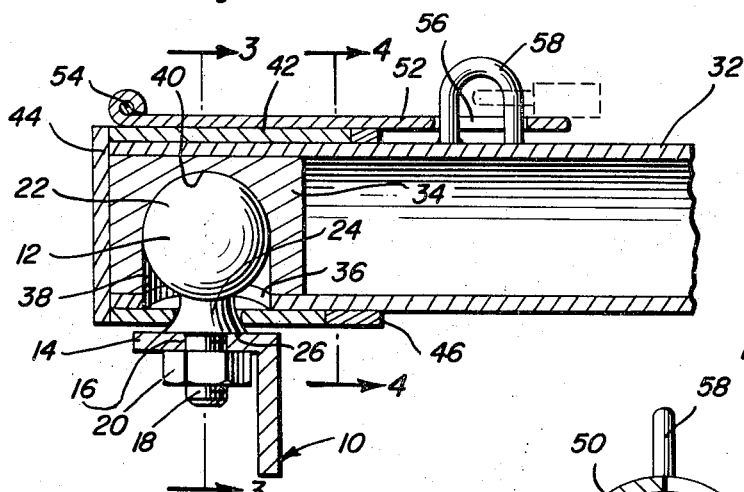
FIGURE 2 is a fragmentary longitudinal vertical sectional view taken substantially upon a plane passing through the longitudinal center line of the tongue portion illustrated in FIGURE 1.
Figure 4:
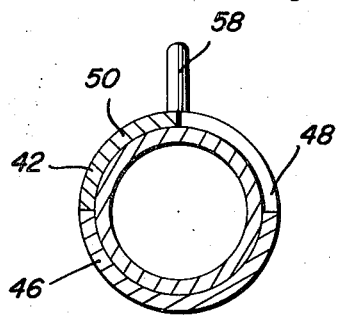
FIGURE 4 is a transverse vertical sectional view taken substantially upon the plane indicated by the section line 4—4 of FIGURE 2.
Figure 3:
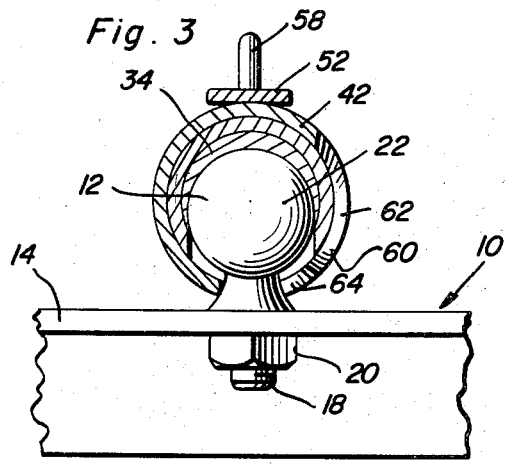
FIGURE 3 is a fragmentary transverse vertical sectional view taken substantially upon a plane indicated by section line 3—3 of FIGURE 2.

From FIGURE 2 of the drawings it may be seen that the ball portion 22 of the ball hitch element 12 is snugly and seatingly receivable in the seat 40 and that the ball portion 22 may be advanced into engagement with the seat 40 through opening 36 and the outer end of the bore 38.

A locking sleeve 42 is journaled on the end portion of the cylindrical member 32 and an end wall 44 is secured to the end edges of the cylindrical member 32 and the plug 34, thereby stationarily positioning the plug 34 in the cylindrical member 32, and serves to prevent the locking sleeve 42 from being slid longitudinally off the end of the cylindrical member 32.

A thrust bearing sleeve 46 is secured to the cylindrical member 32 on the side of the locking sleeve 42 remote from the end wall 44 and includes a circumferentially extending notch 48 which opens toward the end wall 44. The locking sleeve 42 includes a circumferentially extending and axial projecting lug or projection 50 whose circumferential extent is approximately 90 degrees less than the circumferential extent of the notch 48 and which is disposed in the latter. A locking lever 52 is hingedly supported from the locking sleeve 42 by means of a hinge assembly 54 and is slotted on its free end as at 56. A generally inverted U-shaped hasp 58 is secured to the cylindrical member 32 and is receivable through the slot 56 in the locking lever 52 when the latter is disposed as illustrated in FIGURE 1 of the drawings. In addition, the locking sleeve 42 includes a circumferentially extending slot 60 including one transversely enlarged end portion 62 and a narrow opposite end portion 64. The transversely enlarged end portion 62 defines a circular opening which, when the locking sleeve 42 is oscillated on the cylindrical member 32 to the position illustrated in FIGURE 5 of the drawings, is registered with the opening 36 and bore 38. The enlarged end portion 62 includes substantially the same diametric dimension as the opening 36 and the outer end of the bore 38 and therefore the ball portion 22 of the ball hitch element 12 is receivable in the enlarged end portion 62 of the slot 60, the opening 36, and the outer end of the bore 38 when the locking sleeve 42 is rotated to the position illustrated in FIGURE 5 of the drawings. In this position rotation of the locking sleeve 42 relative to the cylindrical member 32, the projection 50 is seated in one end of the notch 48. After the ball hitch element 12 has been seated within the seat 40 in the plug 34, the locking sleeve 42 may be rotated from the position illustrated in FIGURE 5 of the drawings to the position illustrated in FIGURE 1 of the drawings. This pivoted position of the locking sleeve 42 is defined by engagement of the projection 50 with the other end of the notch 48 and allows the locking lever 52 to be pivoted from the position illustrated in FIGURE 5 of the drawings to the position illustrated in FIGURE 1 of the drawings with the hasp 58 received through the slot 56 and adapted to receive therethrough the hasp of a padlock or the like in order to lockingly secure the locking lever 52 in the locked position illustrated in FIGURE 1.

In FIGURE 2 of the drawings it may be seen that the narrow end portion 64 of the slot 60 embracingly engages the shank portion 24 to prevent withdrawal of the ball portion 22 from the plug 34.

In FIGURE 8 of the drawings there may be seen an adapter unit generally referred to by the reference numeral 70 defining a generally cylindrical tubular member 72 closed at one end by means of a semi-spherical end wall 74. The adapter unit 70 is snugly receivable in the bore 38 and is seatingly engageable with the seat 40 and further includes a circumferentially extending rib 76 seatingly receivable in a corresponding groove 78 formed in the cylindrical member 32 about the opening 86 to releasably secure the adapter unit 70 within the plug 34. Of course, because of the thickness of the wall of the adapter unit 70, the adapter unit 70 adapts the socket hitch assembly or element 28 to receive the ball portion 80 of a smaller ball hitch element 82.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A socket hitch element including an elongated body provided with one hollow cylindrical end portion, a radial opening formed in said one end portion spaced from the terminal end thereof, a cylindrical plug member axially snugly telescoped into said one end portion and including a generally radially outwardly opening recess whose outer end is registered with said opening, said opening being adapted to pass the ball portion of a ball hitch element therethrough and said recess being adapted to seatingly receive said ball portion inwardly of said cylindrical end portion with the reduced diameter shank portion of said element passing through said opening, and a sleeve telescoped over said cylindrical end portion and journalled therefrom, said sleeve including a circumferential slot formed therein with circumferentially spaced apart closed ends, said slot including first and second opposite end portions selectively registrable with said opening upon selected oscillation of said sleeve relative to said cylindrical end portion, one of said slot end portions being narrow and adapted to snugly embracingly receive said reduced diameter end portion therethrough and the other of said slot end portions being wide and adapted to pass said ball portion therethrough, an elongated arm pivotally secured at one end portion to said sleeve for rotation about an axis extending transversely of said arm and said sleeve, the other end portion of said arm and elongated body including coacting means releasably engageable with each other when said arm is disposed substantially parallel to said elongated body and said sleeve is in said second position thereof and operative to prevent rotation of said sleeve toward said first position thereof.

2. The combination of claim 1 including an adapter unit for said body adapting the latter to be used in conjunction with a ball hitch element including a ball portion smaller in diameter than the diameter of said seat, said adapter comprising a generally cylindrical tubular member closed at one end by means of a semi-spherical end wall, said cylindrical tubular member being snugly receivable in said recess with said end wall seated in said recess, said end wall defining a generally semi-spherical seat adapted to snugly seatingly receive the ball portion of a conventional ball hitch member whose ball portion is smaller in diameter than the first mentioned ball portion.

3. The combination of claim 1 wherein the center lines of said opening and said recess intersect with the longitudinal center axis of said cylindrical end portion.

4. The combination of claim 1 wherein said elongated body is horizontally disposed and said arm, when said sleeve is in said second position thereof, is disposed on top of said elongated body and disposed at one side of said body when said sleeve is in said first position thereof, said arm also serving as an eccentric weight for said sleeve whereby said sleeve will tend to remain, by gravity in said first position.

5. The combination of claim 1 wherein said terminal end of said cylindrical end portion has a transverse end wall secured thereover, said plug abutting against and being secured to the inner end of said end wall, said end wall projecting outwardly beyond the outer surface portions of said cylindrical end portion and comprising abutment means preventing axial withdrawal of said sleeve outwardly of said terminal end portion of said cylindrical end portion.

6. A socket hitch element for connection with a ball hitch element comprising a body provided with a cylindrical portion, a radially outwardly opening recess in said body, said recess being adapted to seatingly receive the ball portion of the ball hitch element, and a sleeve telescoped over said cylindrical portion and rotatably journalled thereon, said sleeve including a circumferential slot formed therein with circumferentially spaced apart closed ends, said slot including first and second opposite end portions selectively registrable with said recess upon selected oscillation of said sleeve relative to said cylindrical portion, one of said slot end portions being narrow and adapted to snugly embracingly receive the reduced diameter shank portion of the ball hitch element therethrough when the sleeve is in a first position to retain the ball portion of the ball hitch element in the recess, the other of said slot end portions being wide and adapted to pass the ball portion of the ball hitch element therethrough when the sleeve is in a second position to enable the ball portion of the ball hitch element to pass into and be removed from the recess, an elongated arm pivotally secured at one end portion to said sleeve for rotation about an axis extending transversely of said arm and said sleeve, the other end portion of said arm and said body including coacting means releasably engageable with each other when said arm is disposed substantially parallel to said body and said sleeve is in said first position thereof and operative to prevent rotation of said sleeve toward said second position thereof.

7. The combination of claim 6 wherein said body is horizontally disposed and said arm, when said sleeve is in said first position thereof, is disposed on top of said body and disposed at one side of said body when said sleeve is in said second position thereof, said arm also serving as an eccentric weight for said sleeve whereby said sleeve will tend to remain, by gravity in said second position, said cylindrical portion of said body having an end wall rigid therewith, said end wall projecting outwardly beyond the outer surface of said cylindrical portion and comprising abutment means preventing axial withdrawal of said sleeve outwardly of said cylindrical portion of the body, and coacting means on said body and sleeve limiting rotational movement of the sleeve to the first and second positions thereof, said coacting means between said arm and body including an upstanding lug rigid with the body, said lug having an opening therethrough for receiving a lock, said arm having an opening therethrough receiving said lug when the sleeve is in its first position and the arm is substantially parallel to the said body whereby gravity will retain the arm engaged with the lug to prevent rotation of the sleeve to the second position even without a lock engaged with the lug.

References Cited

UNITED STATES PATENTS

| | | | |
|---|---|---|---|
| 2,817,551 | 12/1957 | Gieleghem | 287—90 |
| 2,848,253 | 8/1958 | Walker | 280—5 |

FOREIGN PATENTS

| | | |
|---|---|---|
| 659,456 | 10/1951 | England. |
| 734,682 | 10/1932 | France. |
| 1,340,713 | 9/1963 | France. |

BENJAMIN HERSH, *Primary Examiner.*

J. SIEGEL, *Assistant Examiner.*